United States Patent
Bian

(10) Patent No.: US 11,789,208 B1
(45) Date of Patent: Oct. 17, 2023

(54) EDGE COUPLERS IN THE BACK-END-OF-LINE STACK OF A PHOTONIC CHIP HAVING A SEALED CAVITY

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 32 days.

(21) Appl. No.: 17/658,821

(22) Filed: Apr. 11, 2022

(51) Int. Cl.
  G02B 6/30 (2006.01)
  G02B 6/136 (2006.01)
  G02B 6/122 (2006.01)

(52) U.S. Cl.
  CPC ........... G02B 6/305 (2013.01); G02B 6/1225 (2013.01); G02B 6/1228 (2013.01); G02B 6/136 (2013.01)

(58) Field of Classification Search
  CPC ...... G02B 6/43; G02B 6/1228; G02B 6/1225; G02B 6/136; G02B 6/305; G02B 6/3853; G02B 6/4246; G02B 6/4269; G02B 6/4292; G02B 6/4249; G02B 6/32; G02B 6/4204; G02B 6/4257
  See application file for complete search history.

(56) References Cited

U.S. PATENT DOCUMENTS

| | | | |
|---|---|---|---|
| 10,126,500 B2 | 11/2018 | Qi et al. | |
| 10,197,731 B2 | 2/2019 | Teng et al. | |
| 11,487,059 B2 * | 11/2022 | Sahin | G02B 6/13 |
| 2017/0017034 A1 | 1/2017 | Painchaud et al. | |
| 2019/0154919 A1 | 5/2019 | Teng et al. | |
| 2022/0413232 A1 * | 12/2022 | Porter | G02B 6/122 |

OTHER PUBLICATIONS

U.S. Appl. No. 17/179,532, filed Feb. 19, 2021, Sahin et al.
U.S. Appl. No. 17/146,864, filed Jan. 12, 2021, Bian et al.
U.S. Appl. No. 17/151,955, filed Jan. 19, 2021, Bian et al.
U.S. Appl. No. 17/173,639, filed Feb. 11, 2021, Bian et al.
Pavel Cheben et al., Refractive index engineering with subwavelength gratings for efficient microphotonic couplers and planar waveguide multiplexers, Optics Letters, 2010, pp. 2525-2528, vol. 35—No. 15, Optica Publishing Group.
Barwicz et al., An O-band Metamaterial Converter Interfacing Standard Optical Fibers to Silicon Nanophotonic Waveguides, 2015 Optical Fiber Communications Conference and Exhibition (OFC), 2015, pp. 1-3, IEEE.

(Continued)

*Primary Examiner* — Michael P Mooney
(74) *Attorney, Agent, or Firm* — Anthony Canale

(57) ABSTRACT

According to an aspect of the present disclosure, an edge coupler for a photonic chip is provided. The edge coupler includes a substrate having a top surface, a sealed cavity in the substrate, a waveguide core, and a back-end-of-line stack. The sealed cavity has varying depths relative to the top surface of the substrate. The waveguide core is over the sealed cavity. The back-end-of-line stack includes a side edge, an interlayer dielectric layer, and an assisting waveguide. The assisting waveguide is on the interlayer dielectric layer adjacent to the side edge. The assisting waveguide and the waveguide core have an overlapping arrangement with the sealed cavity in the substrate.

20 Claims, 10 Drawing Sheets

(56) References Cited

OTHER PUBLICATIONS

Teng et al., Trident shape SOI metamaterial fiber-to-chip edge coupler, Optical Fiber Communication Conference (OFC) 2019, 2019, pp. 1-3, Optica Publishing Group.

Shang et al., Silicon nitride tri-layer vertical Y-junction and 3D couplers with arbitrary splitting ratio for photonic integrated circuits, Optics Express, May 2017, pp. 10474-10483, vol. 25—No. 9, Optics Express.

Tummidi et al., Multilayer Silicon Nitride based Coupler Integrated into a Silicon Photonics Platform with a 0.5dB Coupling Loss between Standard SMF and the As-Diced Chip Edge Facet, 2019 IEEE 16th International Conference on Group IV Photonics (GFP), Aug. 2019, pp. 1-2, IEEE.

Mu et al., Edge Couplers in Silicon Photonic Integrated Circuits: A Review, Applied Sciences, Feb. 2020, pp. 1-29, vol. 10—No. 1538, MDPI.

Papes et al., Fiber-chip edge coupler with large mode size for silicon photonic wire waveguides, Feb. 2016, pp. 1-13, vol. 24—No. 5, OSA.

Giewont et al., 300-mm Monolithic Silicon Photonics Foundry Technology, IEEE Journal of Selected Topics in Quantum Electronics, Oct. 2019, pp. 1-11, vol. 25, No. 5, IEEE.

Bian et al., 3D Integrated Laser Attach Technology on 300-mm Monolithic Silicon Photonics Platform, 2020 IEEE Photonics Conference (IPC), Nov. 2020, pp. 1-2, IEEE.

Bian et al., Monolithically integrated silicon nitride platform, 2021 Optical Fiber Communications Conference and Exhibition (OFC), 2021, pp. 1-3, IEEE.

Bian et al., Hybrid III-V laser integration on a monolithic silicon photonic platform, 2021 Optical Fiber Communications Conference and Exhibition (OFC), 2021, pp. 1-3, IEEE.

Peng et al., A CMOS Compatible Monolithic Fiber Attach Solution with Reliable Performance and Self-alignment, 2020 Optical Fiber Communications Conference and Exhibition (OFC), 2020, pp. 1-3, IEEE.

Bian et al., Towards low-loss monolithic silicon and nitride photonic building blocks in state-of-the-art 300mm CMOS foundry, OSA Technical Digest, 2020, pp. 1-2, Optica Publishing Group.

Rakowski et al., 45nm CMOS—Silicon Photonics Monolithic Technology (45CLO) for next-generation, low power and high speed optical interconnects, 2020 Optical Fiber Communications Conference and Exhibition (OFC), 2020, pp. 1-3, IEEE.

\* cited by examiner

EDGE COUPLERS IN THE BACK-END-OF-LINE STACK OF A PHOTONIC CHIP HAVING A SEALED CAVITY

TECHNICAL FIELD

The present disclosure relates generally to photonic chips, and more particularly to edge couplers and methods of forming the same.

BACKGROUND

Photonic chips integrate optical components and electronic components into a single platform. The optical components may include, for example, waveguides, optical switches, couplers, and modulators. The electronic components may include, for example, field-effect transistors. The electronic components may be operatively coupled to the optical components for the functioning of the photonic chips.

An edge coupler is commonly used for coupling light of a given mode from a light source, such as a laser or an optical fiber, to the other optical components and/or electronic components on the photonic chip. As the light source is typically larger than the edge coupler, the edge coupler may be unable to fully confine the incident mode received and as a result, the edge coupler may exhibit significant power losses.

Therefore, solutions are provided to overcome, or at least ameliorate, the disadvantages described above.

SUMMARY

To achieve the foregoing and other aspects of the present disclosure, edge couplers and methods of forming the same are presented.

According to an aspect of the present disclosure, an edge coupler for a photonic chip is provided. The edge coupler includes a substrate having a top surface, a sealed cavity in the substrate, a waveguide core, and a back-end-of-line stack. The sealed cavity has varying depths relative to the top surface of the substrate. The waveguide core is over the sealed cavity. The back-end-of-line stack includes a side edge, an interlayer dielectric layer, and an assisting waveguide. The assisting waveguide is on the interlayer dielectric layer adjacent to the side edge. The assisting waveguide and the waveguide core have an overlapping arrangement with the sealed cavity in the substrate.

According to another aspect of the present disclosure, an edge coupler for a photonic chip is provided. The edge coupler includes a substrate having a bottom surface, a sealed cavity in the substrate, a waveguide core, and a back-end-of-line stack. The substrate has varying heights relative to the bottom surface. The waveguide core is over the substrate. The back-end-of-line stack includes a side edge, an interlayer dielectric layer, and a first assisting waveguide. The first assisting waveguide is on the interlayer dielectric layer adjacent to the side edge. The first assisting waveguide and the waveguide core have an overlapping arrangement with the sealed cavity in the substrate.

According to yet another aspect of the present disclosure, a method of forming an edge coupler for a photonic chip is provided. The method includes forming a sealed cavity in a substrate and forming a waveguide core over the sealed cavity. The cavity is collectively surrounded by an insulator layer and a base substrate of the substrate. A back-end-of-line stack is formed over the sealed cavity and includes forming an interlayer dielectric layer over the waveguide core and forming an assisting waveguide over the interlayer dielectric layer. A side edge of the interlayer dielectric layer and an end surface of the assisting waveguide form a part of a side edge of the back-end-of-line stack. The assisting waveguide and the waveguide core have an overlapping arrangement with the sealed cavity in the substrate.

BRIEF DESCRIPTION OF THE DRAWINGS

The embodiments of the present disclosure will be better understood from a reading of the following detailed description, taken in conjunction with the accompanying drawings.

Figure 1A:
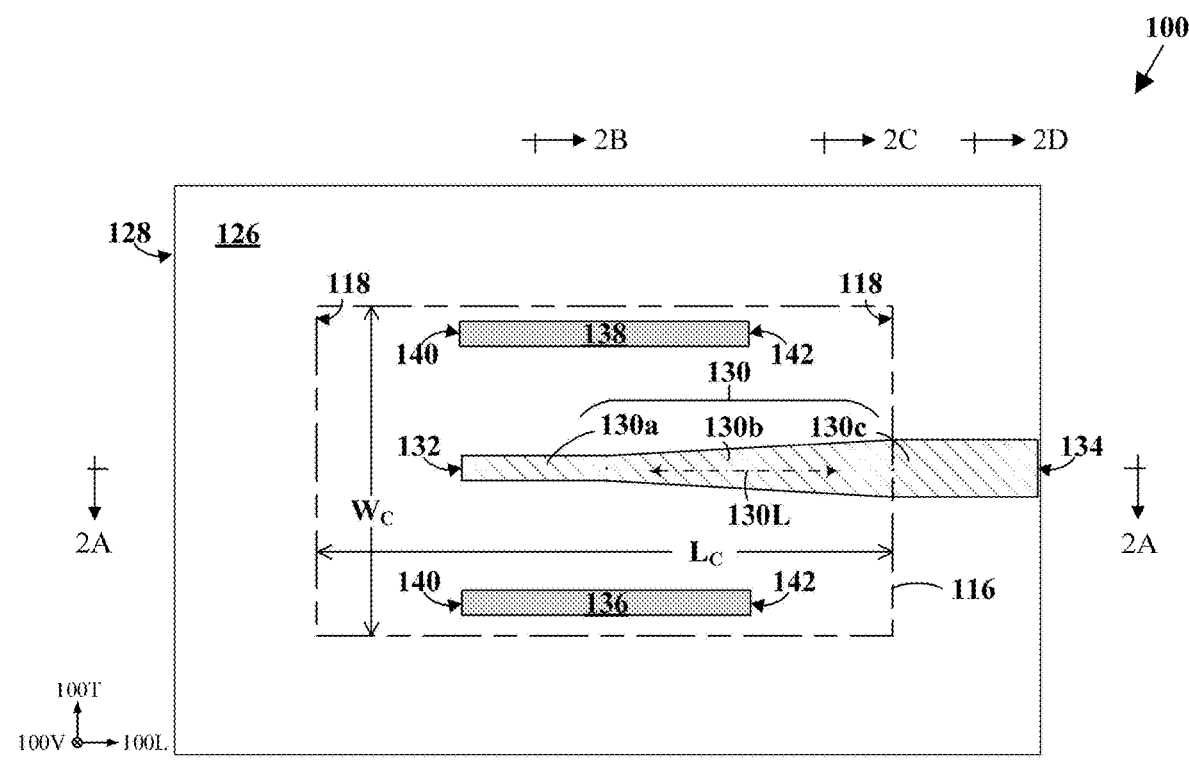
FIGS. 1A and 1B are exemplary top-down views of an edge coupler of a photonic chip at an initial fabrication stage of a processing method, according to embodiments of the disclosure.

For simplicity and clarity of illustration, the drawings illustrate the general manner of construction, and certain descriptions and details of well-known features and techniques may be omitted to avoid unnecessarily obscuring the discussion of the described embodiments of the disclosure.

Additionally, features in the drawings are not necessarily drawn to scale. For example, the dimensions of some of the features in the drawings may be exaggerated relative to other features to help improve understanding of embodiments of the device. The same reference numerals in different drawings denote the same features, while similar reference numerals may, but do not necessarily, denote similar features.

DETAILED DESCRIPTION

The present disclosure relates generally to photonic chips, and more particularly to edge couplers and methods of forming the same. Various embodiments of the present disclosure are now described in detail with accompanying drawings. It is noted that like and corresponding features are referred to by the use of the same reference numerals. The embodiments disclosed herein are exemplary, and not intended to be exhaustive or limiting to the disclosure.

Figure 1B:
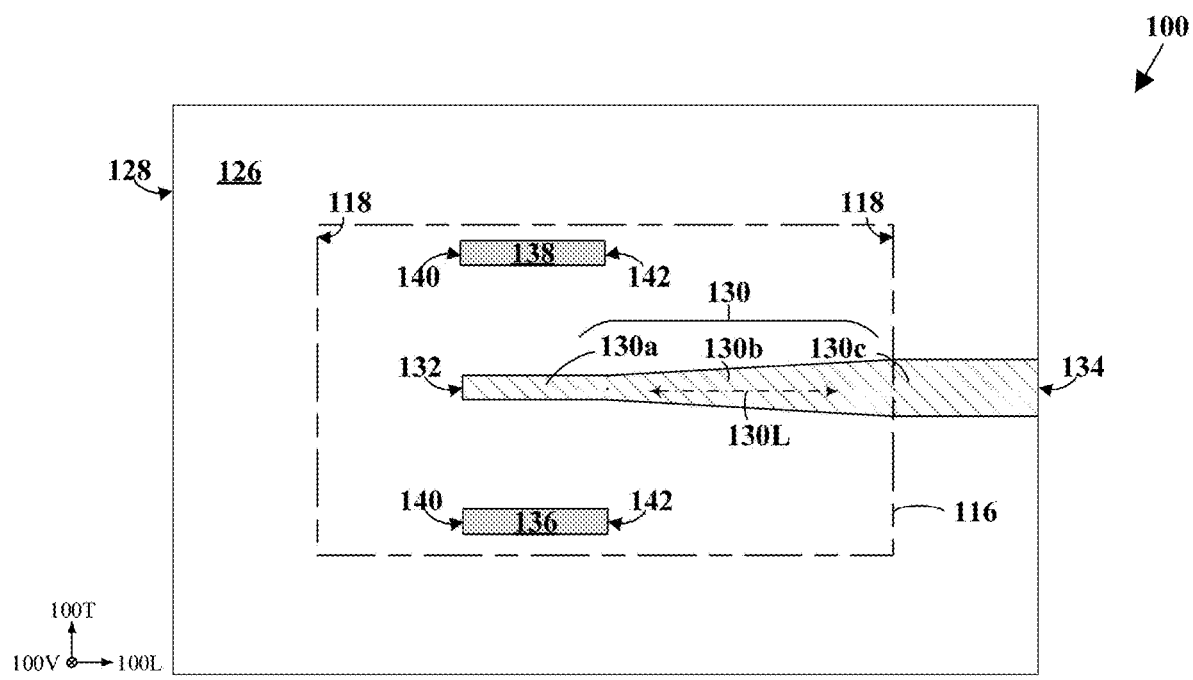

FIGS. 1A and 1B are exemplary top-down views of an edge coupler 100 at an initial fabrication stage of a processing method, according to embodiments of the disclosure. FIGS. 2A through 2D are cross-sectional views of the edge coupler 100 taken generally along respective lines 2A-2A, 2B-2B, 2C-2C, and 2D-2D in FIG. 1A, according to embodiments of the disclosure. The edge coupler 100 may be used in a photonic chip.

The edge coupler 100 may have a longitudinal axis 100L, a transverse axis 100T, and a vertical axis 100V. The longitudinal axis 100L, the transverse axis 100T, and the vertical axis 100V determine the length, the width, and the height, respectively, of the edge coupler 100. The edge coupler 100 may include a side edge 102. The side edge 102 of the edge coupler 100 may be arranged substantially perpendicular to the longitudinal axis 100L. In an embodiment of the disclosure, the side edge 102 of the edge coupler 100 may be substantially planar. In another embodiment of the disclosure, the side edge 102 of the edge coupler 100 may serve as an input from a light source, such as a laser or an optical fiber, to the other optical and/or electronic components in the photonic chip.

The edge coupler 100 may include a substrate 104. The substrate 104 may include a layered substrate, such as a semiconductor-on-insulator (SOI) substrate, or a bulk substrate. For purposes of description in the present disclosure, the substrate 104 will be referred to as a layered substrate. The substrate 104 may include a buried insulator layer 106 arranged between a device layer (not shown) and a base substrate 108. The device layer may be where the optical components, including the edge coupler 100, and the electronic components of the photonic chip may be arranged adjacent to, in, and/or above the device layer.

The buried insulator layer 106 may include a side edge 110, and the side edge 110 of the buried insulator layer 106 may form a part of the side edge 102 of the edge coupler 100. The buried insulator layer 106 may include a dielectric material, for example, silicon dioxide. In an embodiment of the disclosure, the side edge 110 of the buried insulator layer 106 may be substantially planar.

The base substrate 108 may have a top surface 112 upon which the buried insulator layer 106 overlies and a bottom surface 114 laterally opposite the top surface 112. The base substrate 108 may include a semiconductor material, such as silicon, silicon germanium, silicon carbide, or other semiconductor compounds, for example, II-VI or III-V semiconductor compounds.

Figure 2A:
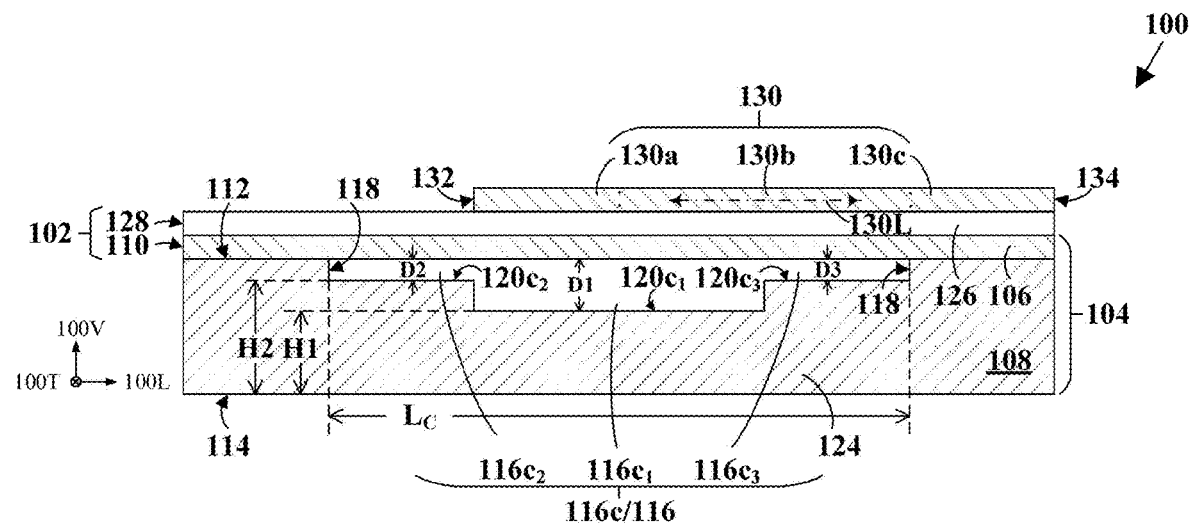
FIGS. 2A through 2D are cross-sectional views of the edge coupler taken generally along respective lines 2A-2A, 2B-2B, 2C-2C, and 2D-2D in FIG. 1A, according to embodiments of the disclosure.
Figure 2B:
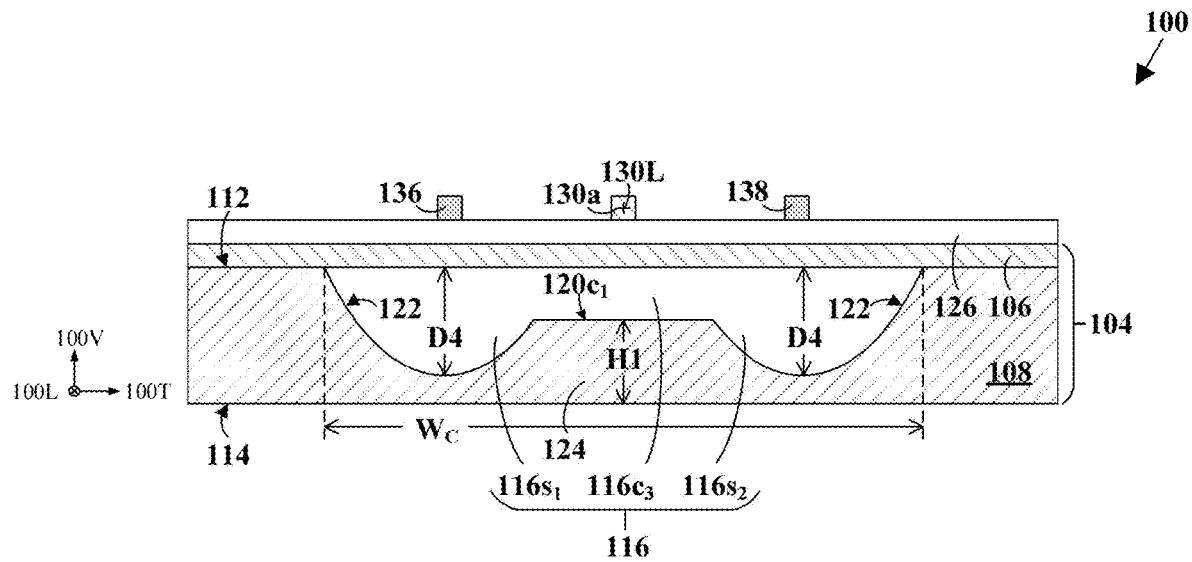
Figure 2C:
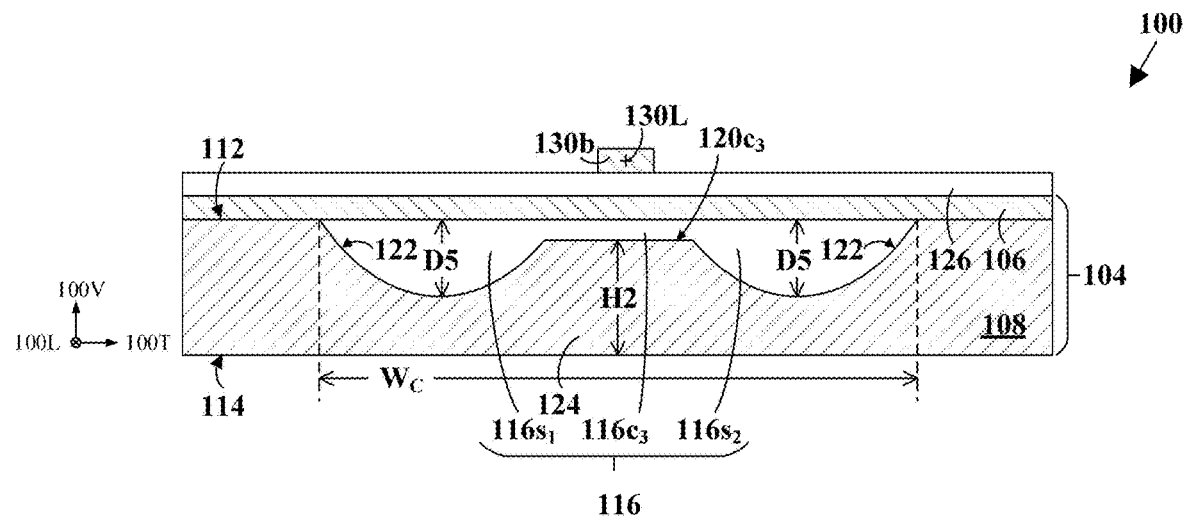
Figure 2D:
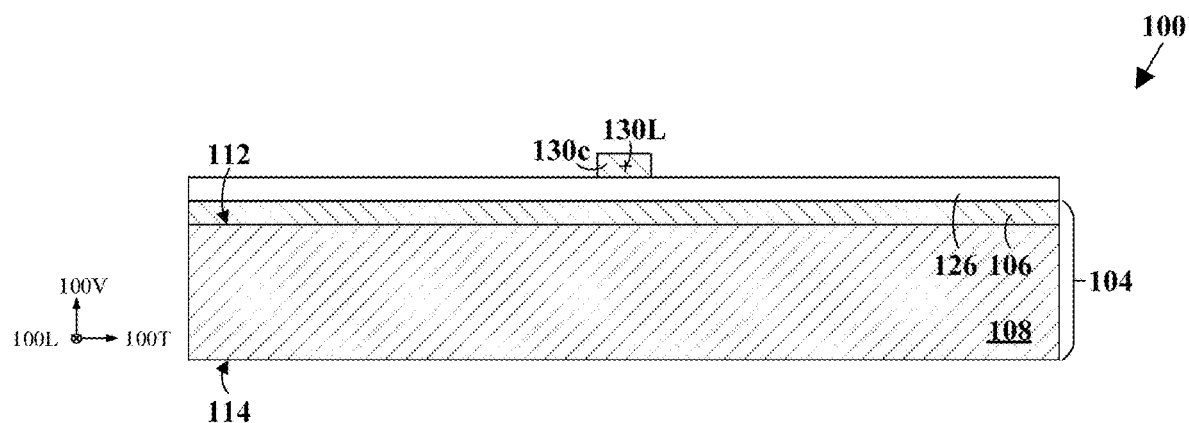

As illustrated in FIGS. 2A through 2C, the base substrate 108 may include a cavity 116 therewithin and under the buried insulator layer 106; the outline of the cavity 116 in FIGS. 1A and 1B are diagrammatically shown by a long dash-short-dash line for purposes of illustration. The cavity 116 may have a finite length $L_C$ which lies substantially parallel to the longitudinal axis 100L of the edge coupler 100 and a width Wc which lies perpendicular thereto. The cavity 116 may be collectively surrounded by the buried insulator layer 106 from above and by the base substrate 108 from below and laterally, which fully seals the cavity 116. For example, portions of the base substrate 108 may enclose the cavity 116 and define the longitudinal and transverse boundaries of the cavity 116. In another example, a portion of the buried insulator layer 106 may form a substantially flat ceiling of the cavity 116.

The cavity 116 may have varying depths relative to the top surface 112 of the base substrate 108. For example, as illustrated in FIG. 2A, the cavity 116 may include a central cavity portion 116c that may be arranged substantially parallel to the longitudinal axis 100L of the edge coupler 100. The central cavity portion 116c may include ends 118 that determine the length $L_C$ of the cavity 116. The central cavity portion 116c between the ends 118 may have varying depths. For example, the central cavity portion 116c may include a center region $116c_1$ arranged between an end region $116c_2$ and an end region $116c_3$; the end region $116c_2$ may be arranged proximate to the side edge 102 of the edge coupler 100. The center region $116c_1$ of the cavity 116 may have a depth D1 and each end region $116c_2$, $116c_3$ may have a depth D2 and D3, respectively, which is shallower than the depth D1 of the center region $116c_1$.

The varying depths of the cavity 116 may minimize potential optical signal losses through the substrate 104 when the optical signals propagate through the edge coupler 100 and may take on various configurations. For example, the respective depths D2, D3 of the end regions $116c_2$, $116c_3$ may be substantially equal, and the central cavity portion 116c may acquire a "T-shaped" profile, as illustrated in FIG. 2A. In another example, the end regions $116c_2$, $116c_3$ may not necessarily have a substantially equal depth, as long as the depth D1 of the center region $116c_1$ is the deepest relative to that of the end regions $116c_2$, $116c_3$. In yet another example, the depth D3 of the end region $116c_3$ and the depth D1 of the center region $116c_1$ may have a substantially equal depth, and the depth D2 of the end region $116c_2$ may be shallower thereto.

The center region $116c_1$ and the respective end region $116c_2$, $116c_3$ may each have a bottom surface $120c_1$, $120c_2$, $120c_3$, respectively. In an embodiment of the disclosure, the bottom surfaces $120c_1$, $120c_2$, $120c_3$ of the respective center region $116c_1$, the end region $116c_2$, and the end region $116c_3$ may be substantially planar. In an embodiment of the disclosure, the bottom surface $120c_1$ of the center region $116c_1$ may be arranged at a depth level lower than the respective bottom surfaces $120c_2$, $120c_3$, of the end regions $116c_2$, $116c_3$. In another embodiment of the disclosure, the center region $116c_1$ of the central cavity portion 116c may have a length that is longer than that of each end region $116c_2$, $116c_3$.

The cavity 116 may further include side cavity portions $116s_1$, $116s_2$ arranged symmetrically relative to the central cavity portion 116c. As illustrated in FIGS. 2B and 2C, the side cavity portions $116s_1$, $116s_2$ may be arranged at laterally opposing sides of the central cavity portion 116c and may extend along with the longitudinal axis 100L of the edge coupler 100. The side cavity portions $116s_1$, $116s_2$ may be connected to and merged with the central cavity portion 116c. The side cavity portions $116s_1$, $116s_2$ may include curved surfaces 122. The curved surfaces 122 of the side cavity portions $116s_1$, $116s_2$ may intersect the bottom surfaces $120c_1$, $120c_2$, $120c_3$ of the central cavity portion 116c. A base substrate ridge 124 may be centered between the side cavity portions $116s_1$, $116s_2$ and may be arranged directly under the central cavity portion 116c. The base substrate ridge 124 may extend along with the longitudinal axis 100L of the edge coupler 100 and may have a length that is no longer than the length of the central cavity portion 116c.

FIG. 2B illustrates the side cavity portions $116s_1$, $116s_2$ arranged at laterally opposing sides of the central cavity portion 116c at the center region $116c_1$. The side cavity portions $116s_1$, $116s_2$ may have a maximum depth D4 that is deeper than the depth D1 of the center region $116c_1$ of the central cavity portion 116c. FIG. 2C illustrates the side cavity portions $116s_1$, $116s_2$ arranged at laterally opposing sides of the central cavity portion 116c at the end region $116c_3$. The side cavity portions $116s_1$, $116s_2$ may have a maximum depth D5 that is deeper than the depth D3 of the end region $116c_3$ of the central cavity portion 116c. The maximum depth D5 of the side cavity portions $116s_1$, $116s_2$ at the end region $116c_3$ of the central cavity portion 116c may be shallower than the maximum depth D4 of the side cavity portions $116s_1$, $116s_2$ at the center region $116c_1$.

Accordingly, the base substrate ridge 124 may have varying heights relative to the bottom surface 114 of the base substrate 108. For example, the base substrate ridge 124 under the center region $116c_1$ of the central cavity portion 116c may have a height H1 that is shorter than that of the height H2 of the base substrate ridge 124 under the end region $116c_3$ of the central cavity portion 116c.

The cavity 116 may be fully sealed to define an air gap, and the air gap may contain air at or near atmospheric pressure, or at sub-atmospheric pressure, for example, a partial vacuum. Although referred to as an "air gap", the elemental composition of the air gap can include different gases and should not be construed as having any particular elemental composition, for example, any number and type of gases may be present in the air gap defined by the sealed cavity 116.

The air gap defined by the sealed cavity 116 may be characterized by a permittivity or a dielectric constant of near unity, for example, vacuum permittivity. The permittivity of the air gap may be less than the dielectric constant of the surrounding solid material, such as the buried insulator layer 106.

The cavity 116 in the substrate 104 may be formed by the following exemplary fabrication process. Openings (not shown) may be formed through the buried insulator layer 106 using a patterning technique, including lithography and etching processes. The openings may expose a portion of the base substrate 108 therein. The openings may be elongated or slotted in shape and may be arranged with a given pitch in parallel rows that are symmetrically arranged relative to the longitudinal axis 100L of the edge coupler 100. The openings may be substantially aligned at a location above the base substrate 108 where the deepest depth of each side cavity portion $116s_1$ and $116s_2$ may be desired.

The openings may define pilot holes for performing a subsequent material removal technique on the base substrate 108. The openings may provide access to the base substrate 108 for the material removal technique performed to form the cavity 116. The material removal technique may include a lateral removal component that deepens the cavity 116 and a vertical removal component that widens the cavity 116. The vertical removal component of the material removal technique may merge the side cavity portions $116s_1$, $116s_2$ to form the central cavity portion 116c. In an embodiment of the disclosure, the material removal technique may include a dry isotropic etching process, including a reactive ion etching process. In another embodiment of the disclosure, the material removal technique may include a wet isotropic etching process, such as one including liquid etchants.

The edge coupler 100 may further include a dielectric layer 126 arranged over the substrate 104. Specifically, the dielectric layer 126 may overlie the buried insulator layer 106 of the substrate 104. The dielectric layer 126 may include a side edge 128, and the side edge 128 of the dielectric layer 126 may form a part of the side edge 102 of the edge coupler 100. The dielectric layer 126 may include a dielectric material, for example, doped or undoped silicon dioxide. The dielectric layer 126 may be deposited over the substrate 104 using a deposition technique, including a chemical vapor deposition process, during middle-of-line processing. In an embodiment of the disclosure, the side edge 128 of the dielectric layer 126 may be substantially planar. In another embodiment of the disclosure, the side edge 128 of the dielectric layer 126 may be substantially planar with the side edge 110 of the buried insulator layer 106.

The edge coupler 100 may yet further include a waveguide core 130. The waveguide core 130 may include a front section 130a, a middle section 130b, and an end section 130c. The middle section 130b of the waveguide core 130 may be arranged between the front section 130a and the end section 130c; the transition of the front section 130a to the middle section 130b and the transition of the middle section 130b to the end section 130c are diagrammatically shown by dotted lines for purposes of illustration. The waveguide core 130 may have a longitudinal axis 130L, and the front section 130a, the middle section 130b, and the end section 130c may be aligned with, and extend along, the longitudinal axis 130L of the waveguide core 130. In an embodiment of the disclosure, the longitudinal axis 130L of the waveguide core 130 may be arranged substantially parallel to the longitudinal axis 100L of the edge coupler 100.

The waveguide core 130 may include end surfaces 132, 134 that terminate the front section 130a and the end section 130c thereof. The end surfaces 132, 134 may determine a finite length of the waveguide core 130 therebetween. In an embodiment of the disclosure, the respective lengths of the front section 130a and the end section 130c may be substantially equal to each other. In another embodiment of the disclosure, the length of the middle section 130b may be longer than the respective lengths of the front section 130a and the end section 130c.

The front section 130a of the waveguide core 130 may be arranged proximate to the side edge 102 of the edge coupler 100 and the end surface 132 of the waveguide core 130 may be spaced apart therefrom. The front section 130a of the waveguide core 130 may serve as an input to the waveguide core 130 for the propagation of the light source through the waveguide core 130 and the end section 130c may serve as an output for the propagation of the light source from the edge coupler 100 to other components in the photonic chip. Accordingly, the end section 130c of the waveguide core 130 may be arranged proximate to the other components, for example, optical components, such as a Mach-Zehnder modulator, and/or electronic components, such as a field-effect transistor, in the photonic chip. In an embodiment of the disclosure, the end surfaces 132, 134 of the waveguide core 130 may be substantially planar and may be substantially parallel to each other.

The front section 130a and the end section 130c of the waveguide core 130 may have a substantially constant width dimension along their respective lengths, though not necessarily the same width dimension. In an embodiment of the disclosure, the width of the front section 130a may be narrower than the width of the end section 130c, as illustrated in FIGS. 1A and 1B.

The middle section 130b of the waveguide core 130 may have a width dimension that varies with position along its length. For example, the waveguide core 130 may have a minimum width that may be substantially equal to the width of the front section 130a and a maximum width that may be substantially equal to the width of the end section 130c, and the middle section 130b may be tapered (i.e., narrows) in a direction towards the end surface 132. In another example, the width of the middle section 130b may increase with increasing distance from the end surface 132 of the waveguide core 130. In an embodiment of the disclosure, the width of the middle section 130b may vary along the longitudinal axis 130L based on a linear function to provide a trapezoidal shape. In another embodiment of the disclosure, the width dimension of the middle section 130b may vary along the longitudinal axis 130L based on a non-linear function, such as a quadratic, parabolic, or exponential function.

The waveguide core 130 may be arranged directly and primarily above the cavity 116 in the substrate 104. In an embodiment of the disclosure, the waveguide core 130 may be arranged directly above the central cavity portion 116c of the cavity 116. For example, the front section 130a of the waveguide core 130 may be arranged directly above the center region $116c_1$ of the central cavity portion 116c, the middle section 130b may traverse across the center region $116c_1$, and the end region $116c_3$ of the central cavity portion 116c, and the end section 130c of the waveguide core 130 may be arranged at an offset from the cavity 116 such that the end section 130c does not overlie the cavity 116. In another embodiment of the disclosure, at least a portion of the front section 130a of the waveguide core 130 may be arranged directly above the end region $116c_2$ of the central cavity portion 116c.

The waveguide core 130 may include a dielectric material, for example, silicon nitride. The waveguide core 130 may be formed by a deposition technique, including a chemical vapor deposition process, and subsequently patterned by a patterning technique, including lithography and etching processes, during middle-of-line processing.

Additionally, the edge coupler 100 may include assisting waveguides 136, 138 arranged on the dielectric layer 126 at the same level as the waveguide core 130 with a spaced arrangement. The assisting waveguides 136, 138 may be further fully arranged above the cavity 116 in the substrate 104. For example, the assisting waveguides 136, 138 may be arranged above each side cavity portion $116s_1$, $116s_2$ of the cavity 116, respectively, as illustrated in FIG. 2B. In another example, the center region $116c_1$ and the end region $116c_3$ of the central cavity portion 116c may be arranged between the assisting waveguides 136, 138.

The assisting waveguides 136, 138 may extend along with the longitudinal axis 100L of the edge coupler 100 and may be substantially parallel to the longitudinal axis 130L of the waveguide core 130. The assisting waveguides 136, 138 may be elongated or slotted in shape. For example, each assisting waveguide 136, 138 may have a length and a width; the length dimension may be significantly larger than the width dimension. Each assisting waveguide 136, 138 may have a finite length and may be terminated by an end surface 140 and an end surface 142 arranged laterally opposite the end surface 140, and the end surfaces 140, 142 determine the length therebetween. In an embodiment of the disclosure, the end surfaces 140, 142 of the assisting waveguides 136, 138 may be substantially planar and may be substantially parallel to each other. In another embodiment of the disclosure, the assisting waveguides 136, 138 may have a substantially constant width dimension along their respective lengths. In yet another embodiment of the disclosure, the assisting waveguides 136, 138 may have a substantially equal width dimension.

The end surfaces 140 of the assisting waveguides 136, 138 may be spaced apart from the side edge 102 of the edge coupler 100, and the length of each assisting waveguide 136, 138 may be shorter than the length of the waveguide core 130. For example, the assisting waveguides 136, 138 may have a length at most as long as the length of the waveguide core 130 that is arranged over the center region $116c_1$ of the central cavity portion 116c. In another example, the end surfaces 140 of the assisting waveguides 136, 138 may be substantially coplanar with the end surface 132 of the waveguide core 130, and the end surfaces 142 of the assisting waveguides may terminate before the end section 130c of the waveguide core 130. In an embodiment of the disclosure, the end surfaces 142 of the assisting waveguides 136, 138 may terminate at a plane that intersects with the middle section 130b of the waveguide core 130. As illustrated in FIG. 1A, the end surfaces 142 of the assisting waveguides 136, 138 may terminate at the plane that intersects approximately the midpoint of the middle section 130b of the waveguide core 130. Alternatively, the end surfaces 142 of the assisting waveguides 136, 138 may terminate before the middle section 130b of the waveguide core 130, as illustrated in FIG. 1B.

As illustrated in FIGS. 1A, 1B, and 2B, the assisting waveguides 136, 138 may be arranged at opposing sides of the waveguide core 130. In an embodiment of the disclosure, the assisting waveguides 136, 138 may be arranged symmetrically relative to the waveguide core 130. Even though FIGS. 1A and 1B illustrate the assisting waveguides 136, 138 as being substantially identical to each other, the assisting waveguides 136, 138 may adopt different geometric configurations from each other, without departing from the scope and spirit of the present disclosure. In an embodiment of the disclosure, the assisting waveguides 136, 138 may have a different length dimension from each other. For example, one of the assisting waveguides 136/138 may have a similar length dimension as the assisting waveguides 136, 138 in FIG. 1A, while the other assisting waveguide 138/136 may have a similar length dimension as the assisting waveguides 136, 138 in FIG. 1B. In another embodiment of the disclosure, the assisting waveguides 136, 138 may have a different width dimension from each other.

The assisting waveguides 136, 138 may be formed concurrently with the waveguide core 130 and may include a dielectric material that is similar to the waveguide core 130 for ease of fabrication. For example, the assisting waveguides 136, 138 may include silicon nitride. Alternatively, the assisting waveguides 136, 138 may include a dielectric material that is different from the dielectric material of the waveguide core 130, for example, silicon carbide.

Figure 3A:
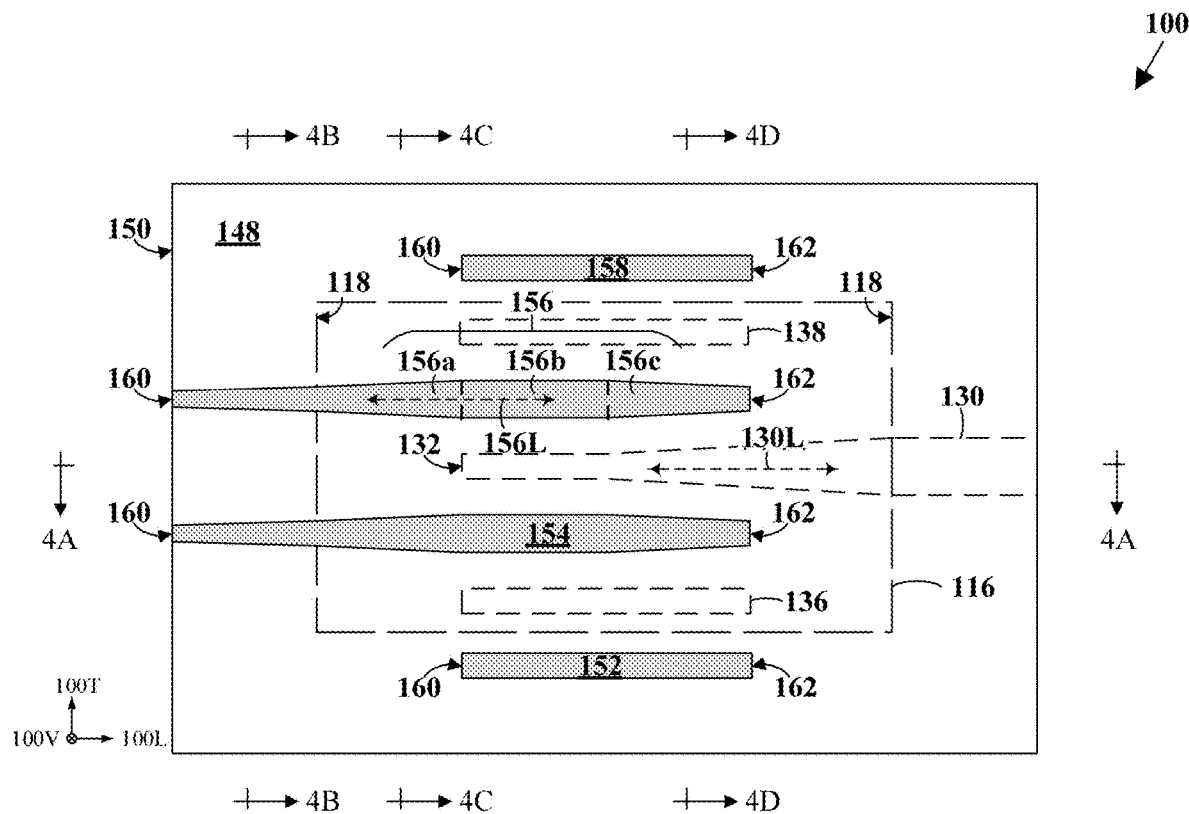
FIGS. 3A and 3B are exemplary top-down views of the edge coupler at a fabrication stage subsequent to FIG. 1A, according to embodiments of the disclosure.
Figure 3B:
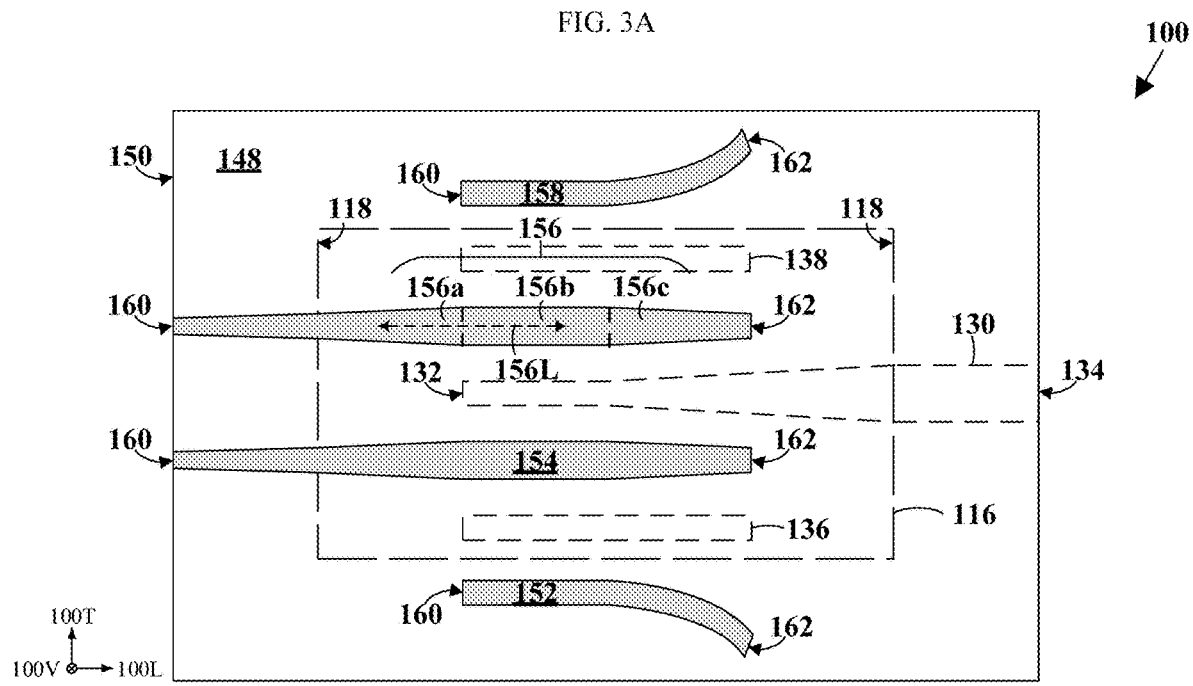

FIGS. 3A and 3B are exemplary top-down views of the edge coupler 100 at a fabrication stage subsequent to FIG. 1A, according to embodiments of the disclosure. FIGS. 4A through 4D are cross-sectional views of the edge coupler 100 taken generally along respective lines 4A-4A, 4B-4B, 4C-4C, and 4D-D in FIG. 3A, according to embodiments of the disclosure. A dielectric stack 144 may be arranged over the dielectric layer 126, the waveguide core 130, and the assisting waveguides 136, 138.

The dielectric stack 144 may include a side edge 146, and the side edge 146 of the dielectric stack 144 may form a part of the side edge 102 of the edge coupler 100. The side edge 146 of the dielectric stack 144 may be further arranged over the side edge 128 of the dielectric layer 126 and the side edge 110 of the buried insulator layer 106. In an embodiment of the disclosure, the side edge 146 of the dielectric stack 144 may be substantially planar. In another embodiment of the disclosure, the side edge 146 of the dielectric stack 144 may be substantially coplanar with the side edge 128 of the dielectric layer 126 and the side edge 110 of the buried insulator layer 106.

The dielectric stack 144 may include one or more layers of dielectric materials, for example, silicon dioxide and/or a dielectric material having a dielectric constant lower than that of silicon dioxide. Examples of dielectric materials having a dielectric constant lower than that of silicon dioxide include carbon-doped silicon dioxide, tetraethyl orthosilicate (TEOS), borophosphosilicate glass (BPSG), or undoped silicate glass (USG). The dielectric stack may also include fluorinated dielectric materials, for example, fluorinated silicon dioxide or fluorinated TEOS. The dielectric stack 144 may further include a semiconductor material, for example, amorphous silicon. The dielectric stack 144 may be deposited using a deposition technique, including a chemical vapor deposition process, during middle-of-line processing.

Another dielectric stack 148 may be arranged over the dielectric stack 144. Similar to the dielectric stack 144, the dielectric stack 148 may include one or more layers of dielectric materials and/or fluorinated dielectric materials, though not necessarily the same materials. In an embodiment of the disclosure, each layer in the dielectric stack 148 may be referred to as an interlayer dielectric layer. The dielectric stack 148 may be deposited using a deposition technique, including a chemical vapor deposition process, during back-end-of-line processing.

The dielectric stack 148 may include a side edge 150, and the side edge 150 of the dielectric stack 148 may form a part of the side edge 102 of the edge coupler 100. The side edge 150 of the dielectric stack 148 may be further arranged over the side edge 146 of the dielectric stack 144, the side edge 128 of the dielectric layer 126, and the side edge 110 of the buried insulator layer 106. In an embodiment of the disclosure, the side edge 150 of the dielectric stack 148 may be substantially planar. In another embodiment of the disclosure, the side edge 150 of the dielectric stack 148 may be substantially coplanar with the side edge 146 of the dielectric stack 144, the side edge 128 of the dielectric layer 126, and the side edge 110 of the buried insulator layer 106.

Assisting waveguides 152, 154, 156, 158 may be arranged on the dielectric stack 148 with a spaced arrangement. The assisting waveguide 154 may be arranged laterally adjacent to the assisting waveguide 152, the assisting waveguide 156 may be arranged laterally adjacent to the assisting waveguide 154, and the assisting waveguide 158 may be arranged laterally adjacent to the assisting waveguide 156.

The assisting waveguides 152, 154, 156, 158 may extend along with the longitudinal axis 100L of the edge coupler 100. For example, the assisting waveguide 156 may have a longitudinal axis 156L that may be substantially parallel to the longitudinal axis 100L of the edge coupler 100. Each of the assisting waveguides 152, 154, 156, 158 may be terminated by an end surface 160 and an end surface 162 arranged laterally opposite the end surface 160.

The end surfaces 160 of the assisting waveguides 154, 156 may be arranged over the side edge 150 of the dielectric stack 148, the side edge 146 of the dielectric stack 144, the side edge 128 of the dielectric layer, and the side edge 110 of the buried insulator layer 106, and may form a part of the side edge 102 of the edge coupler 100. In an embodiment of the disclosure, the end surfaces 160 of the assisting waveguides 154, 156 may be substantially planar. In another embodiment of the disclosure, the end surfaces 160 of the assisting waveguides 154, 156 may be substantially coplanar with the side edge 150 of the dielectric stack 148, the side edge 146 of the dielectric stack 144, the side edge 128 of the dielectric layer, and the side edge 110 of the buried insulator layer 106.

The end surfaces 162 of the assisting waveguides 154, 156 may terminate at a plane that intersects with the waveguide core 130. In an embodiment of the disclosure, the end surfaces 162 of the assisting waveguides 154, 156 may be substantially planar and substantially parallel to their respective end surfaces 160. In another embodiment of the disclosure, the end surfaces 162 of the assisting waveguides 154, 156 may be substantially coplanar with each other. In yet another embodiment of the disclosure, the end surfaces 162 of the assisting waveguides 154, 156 may be substantially coplanar with the end surfaces 142 of the underlying assisting waveguides 136, 138, as illustrated in FIG. 3A.

The end surfaces 160 of the assisting waveguides 152, 158 may be arranged spaced apart from the side edge 102 of the edge coupler 100 and may not form a part of the side edge 102 of the edge coupler 100. For example, the end surfaces 160 of the assisting waveguides 152, 158 may be arranged at an offset from the end surfaces 160 of the assisting waveguides 154, 156. For example, the end surfaces 160 of the assisting waveguides 152, 158 may terminate at a plane that intersects with the assisting waveguides 154, 156. In an embodiment of the disclosure, the end surfaces 160 of the assisting waveguides 152, 158 may be substantially planar. In another embodiment of the disclosure, the end surfaces 160 of the assisting waveguides 152, 158 may be substantially coplanar with each other.

The end surfaces 162 of the assisting waveguides 152, 158 may terminate at a plane that intersects with the waveguide core 130. In an embodiment of the disclosure, the end surfaces 162 of the assisting waveguides 152, 158 may be substantially planar and substantially parallel to their respective end surfaces 160. In another embodiment of the disclosure, the end surfaces 162 of the assisting waveguides 152, 158 may be substantially coplanar with each other. In yet another embodiment of the disclosure, the end surfaces 162 of the assisting waveguides 152, 158 may be substantially coplanar with the end surfaces 142 of the underlying assisting waveguides 136, 138, as illustrated in FIG. 3A.

The end surfaces 160, 162 determine the lengths of the assisting waveguides 152, 154, 156, 158, though the assisting waveguides 152, 154, 156, 158 may not necessarily have the same length dimension. For example, the assisting waveguides 154, 156 may have a substantially equal length, and the assisting waveguides 152, 158 may have a substantially equal length that may be shorter than the assisting waveguides 154, 156. In an embodiment of the disclosure, the lengths of the assisting waveguides 152, 158 may have a length dimension that is substantially equal to the respective lengths of the underlying assisting waveguides 136, 138. In another embodiment of the disclosure, the assisting waveguides 154, 156 may have a length dimension that is substantially equal to the length of the waveguide core 130.

The assisting waveguides 152, 154, 156, 158 may be arranged at an offset over the assisting waveguides 136, 138, and the waveguide core 130, as illustrated in FIGS. 3A and 3B; the outlines of the assisting waveguides 136, 138, and the waveguide core 130 are diagrammatically shown as dash lines, respectively. For example, as illustrated in FIG. 3A, the assisting waveguides 152, 154 may be arranged at laterally opposing sides of the underlying assisting waveguide 136, and the assisting waveguides 156, 158 may be arranged at laterally opposing sides of the underlying assisting waveguide 138. In another example, the assisting waveguides 154, 156 may be arranged at laterally opposing sides of the underlying waveguide core 130.

The assisting waveguides 152, 154, 156, 158 may be further arranged symmetrically relative to the underlying waveguide core 130. For example, the assisting waveguides 152, 154 may be arranged adjacent to one side of the waveguide core 130, and the assisting waveguides 156, 158 may be arranged adjacent to the other side of the waveguide core 130.

As illustrated in FIG. 3A, the assisting waveguides 152, 154, 156, 158 may be arranged substantially parallel to each other. In an embodiment of the disclosure, the assisting waveguides 152, 154, 156, 158 may be arranged substantially parallel to the underlying waveguide core 130.

Alternatively, as illustrated in FIG. 3B, the assisting waveguides 152, 158 may be shaped as a bend that curves away from the longitudinal axis 100L of the edge coupler 100 along the transverse axis 100T. For example, a separation between the assisting waveguide 152 and the assisting waveguide 154 may increase with increasing distance from their respective end surfaces 162 and a separation between the assisting waveguide 158 and the assisting waveguide 156 may increase with increasing distance from their respective end surfaces 162. The assisting waveguide 152 may curve away in an opposite direction relative to the assisting waveguide 158.

In another example, the assisting waveguides 152, 158 may extend between their respective end surfaces 162 over a curved or curvilinear path and may have a given curvature over their respective curved arc length. The curvature of the assisting waveguide 152 may be reversed or inverted relative to the curvature of the assisting waveguide 158. Accordingly, the assisting waveguides 152, 158 may trace smooth curves having a continuously-turning tangent at their inner and outer radii over their respective lengths. In an embodiment of the disclosure, the assisting waveguides 152, 158 may have substantially equal lengths.

The assisting waveguides 154, 156 may have a width dimension that varies with position along its length. Referring to the assisting waveguide 156, the assisting waveguide 156 may include a front section 156a, a middle section 156b, and an end section 156c. The middle section 156b of the assisting waveguide 156 may be arranged between the front section 156a and the end section 156c; the transition of the front section 156a to the middle section 156b and the transition of the middle section 156b to the end section 156c are diagrammatically shown by dotted lines for purposes of illustration. The assisting waveguide 156 may have a longitudinal axis 156L, and the front section 156a, the middle section 156b, and the end section 156c may be aligned with the longitudinal axis 156L thereof. In an embodiment of the disclosure, the longitudinal axis 156L of the assisting waveguide 156 may be arranged substantially parallel to the longitudinal axis 130L of the waveguide core 130.

The front section 156a of the assisting waveguide 156 may have a width dimension that varies with position along its longitudinal axis 156L. For example, the front section 156a may be tapered (i.e., narrows) in a direction towards the end surface 160. In another example, the width dimension of the front section 156a may increase with increasing distance from the end surface 160. In an embodiment of the disclosure, the width dimension of the front section 156a may vary along the longitudinal axis 156L based on a linear function to provide a trapezoidal shape. In another embodiment of the disclosure, the width dimension of the front section 156a may vary along the longitudinal axis 156L based on a non-linear function, such as a quadratic, parabolic, or exponential function.

Similarly, the end section 156c of the assisting waveguide 156 may also have a width dimension that varies with position along the longitudinal axis 156L. For example, the end section 156c may be tapered (i.e., narrows) in a direction towards the end surface 162. In another example, the width dimension of the end section 156c may increase with increasing distance from the end surface 162. In an embodiment of the disclosure, the width dimension of the end section 156c may vary along the longitudinal axis 156L based on a linear function to provide a trapezoidal shape. In another embodiment of the disclosure, the width dimension of the end section 156c may vary along the longitudinal axis 156L based on a non-linear function, such as a quadratic, parabolic, or exponential function. In yet another embodiment of the disclosure, the end section 156c may be shorter than the front section 156a of the assisting waveguide.

The middle section 156b may have a substantially constant width dimension, and the width of the middle section 156b may be substantially equal to the maximum width dimension of the front section 156a and the end section 156c. In an alternative embodiment of the disclosure, the assisting waveguide 156 may be modified to omit the middle section 156b while retaining the front section 156a and the end section 156c. The end section 156c may be lengthened to connect with the front section 156a in order to maintain the finite lengths of the assisting waveguide 156. In an embodiment of the disclosure, the assisting waveguide 154 may be substantially similar to the assisting waveguide 156.

Figure 4A:
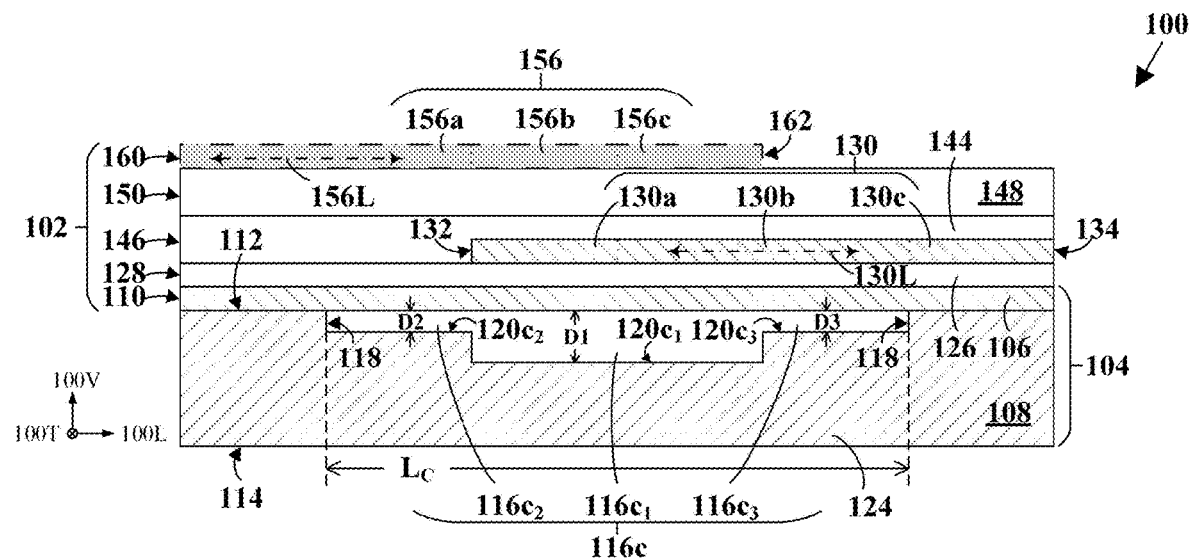
FIGS. 4A through 4D are cross-sectional views of the edge coupler taken generally along respective lines 4A-4A, 4B-4B, 4C-4C, and 4D-4D in FIG. 3A, according to embodiments of the disclosure.
Figure 4B:
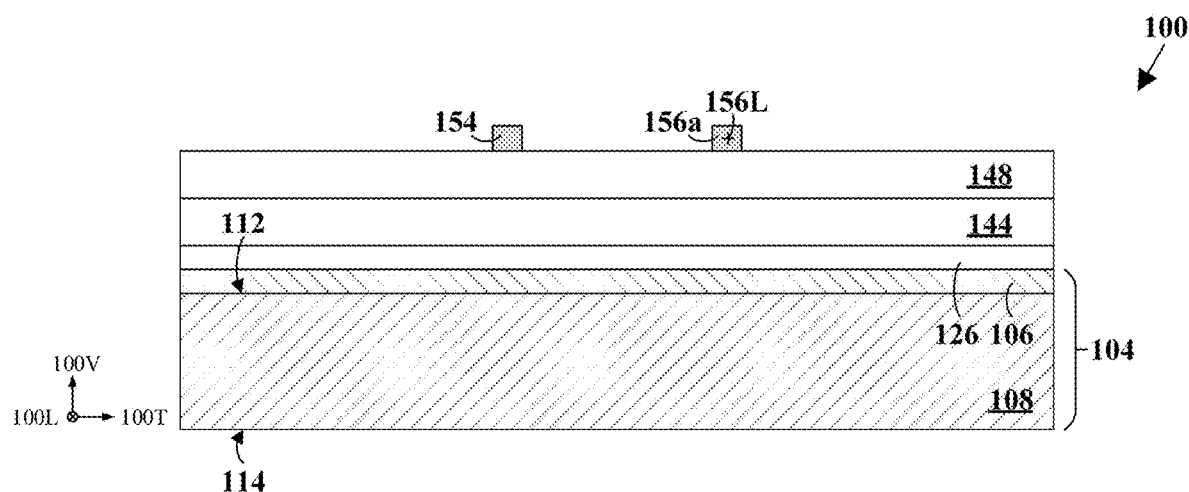
Figure 4C:
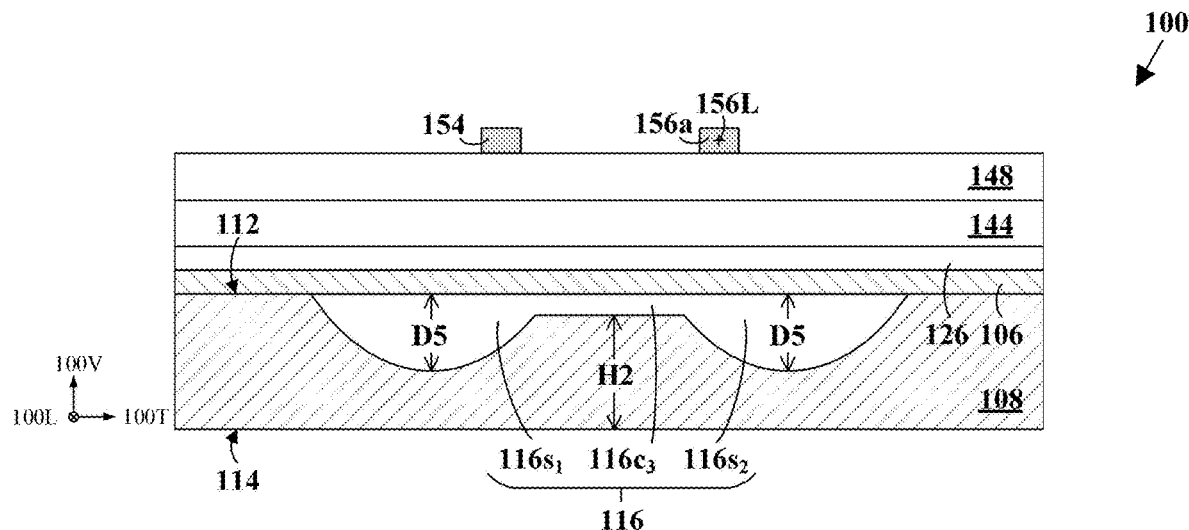
Figure 4D:
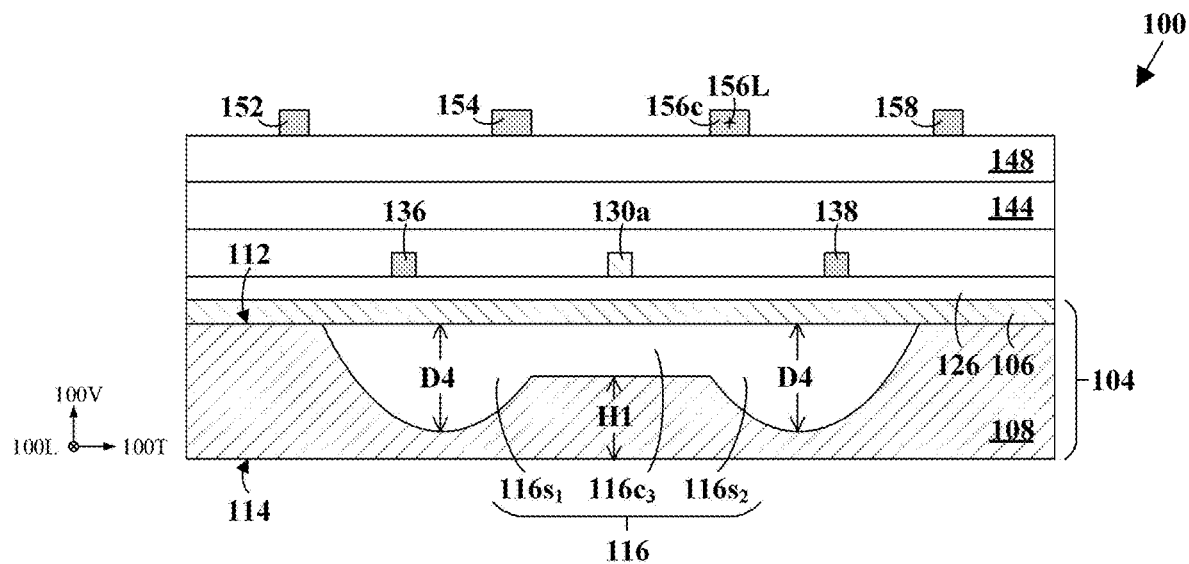

At least a portion of the assisting waveguides 154, 156 may be arranged directly and primarily above the cavity 116 in the substrate 104. For example, the assisting waveguides 154, 156 may be arranged above each side cavity portion $116s_1$, $116s_2$ of the cavity 116, respectively, as illustrated in FIGS. 4C and 4D. The assisting waveguides 154, 156 may be arranged into and out of the page of the accompanying drawings, and the assisting waveguide 156 is illustrated to be arranged into the page of the accompanying drawings and the outline of the assisting waveguide 156 is diagrammatically shown with a double dash-dot line for purposes of illustration. In an embodiment of the disclosure, a portion of the front section 156a of the assisting waveguide 156 may be arranged directly above the base substrate 108, as illustrated in FIGS. 4A and 4B, and another portion of the front section 156a may be arranged directly above the side cavity portion $116s_2$, as illustrated in FIGS. 4A and 4C. The end section 156c of the assisting waveguide 156 may be arranged directly over the side cavity portion $116s_2$ in the substrate 104.

The assisting waveguides 152, 158 may be arranged at an offset from, and do not overlie, the cavity 116, as illustrated in FIGS. 3A, 3B, and 4D. Alternatively, the assisting waveguides may be at least partially arranged directly above the cavity in the base substrate 108, even though this embodiment is not illustrated in the accompanying drawings.

The assisting waveguides 152, 154, 156, 158 may include a material that has a similar material composition as the underlying assisting waveguides 136, 138. For example, the assisting waveguides 152, 154, 156, 158 may include a material having a substantially similar refractive index as the assisting waveguides 136, 138. The assisting waveguides 152, 154, 156, 158 may be deposited using a deposition technique, including chemical vapor deposition process, and subsequently patterned using a patterning technique, including lithography and etching processes, during back-end-of-line processing. In another example, the assisting waveguides 152, 154, 156, 158 may include a dielectric material. In an embodiment of the disclosure, the assisting waveguides 152, 154, 156, 158 may include silicon nitride. In another embodiment of the disclosure, the assisting waveguides 152, 154, 156, 158 may include silicon carbide.

Figure 5A:
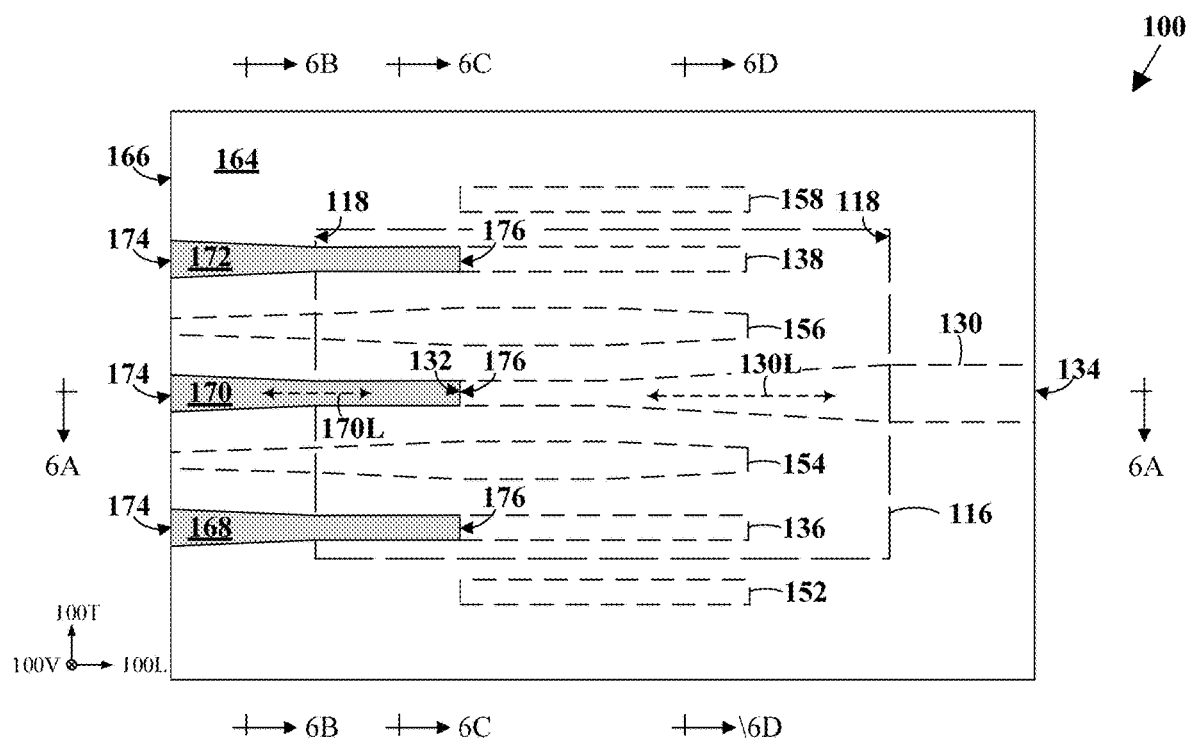
FIGS. 5A through 5C are exemplary top-down views of the edge coupler at a fabrication stage subsequent to FIG. 3A, according to embodiments of the disclosure.
Figure 5B:
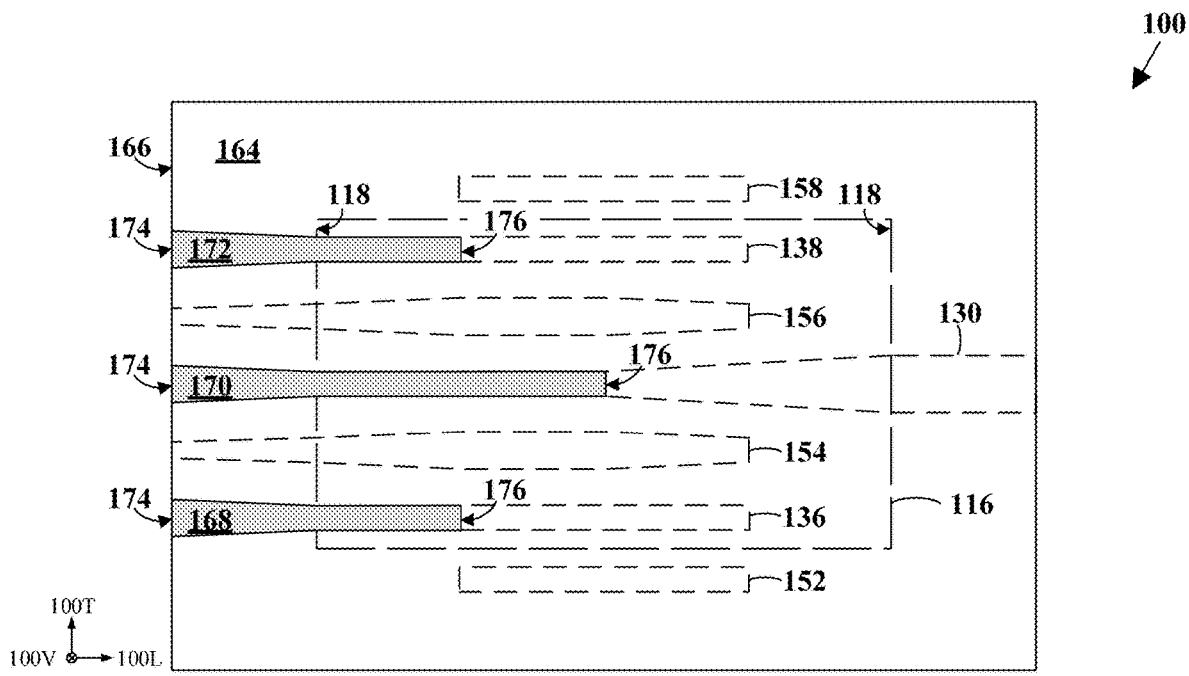
Figure 5C:
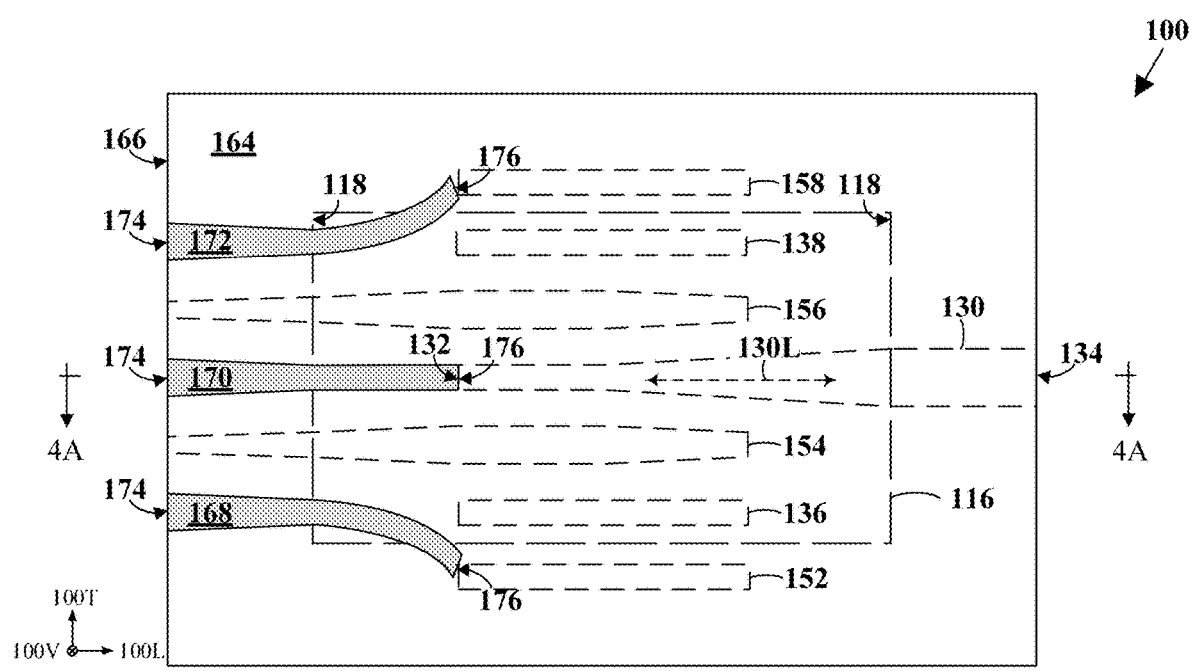
Figure 6A:
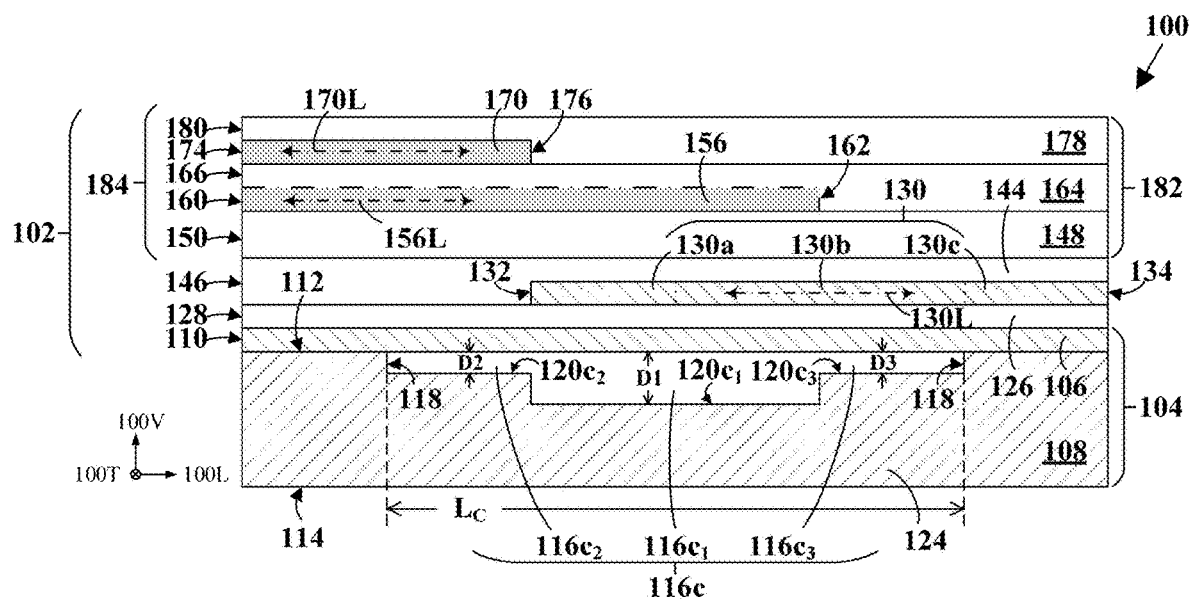
FIGS. 6A through 6D are cross-sectional views of the edge coupler taken generally along respective lines 6A-6A, 6B-6B, 6C-6C, 6D-6D in FIG. 5A, according to embodiments of the disclosure.
Figure 6B:
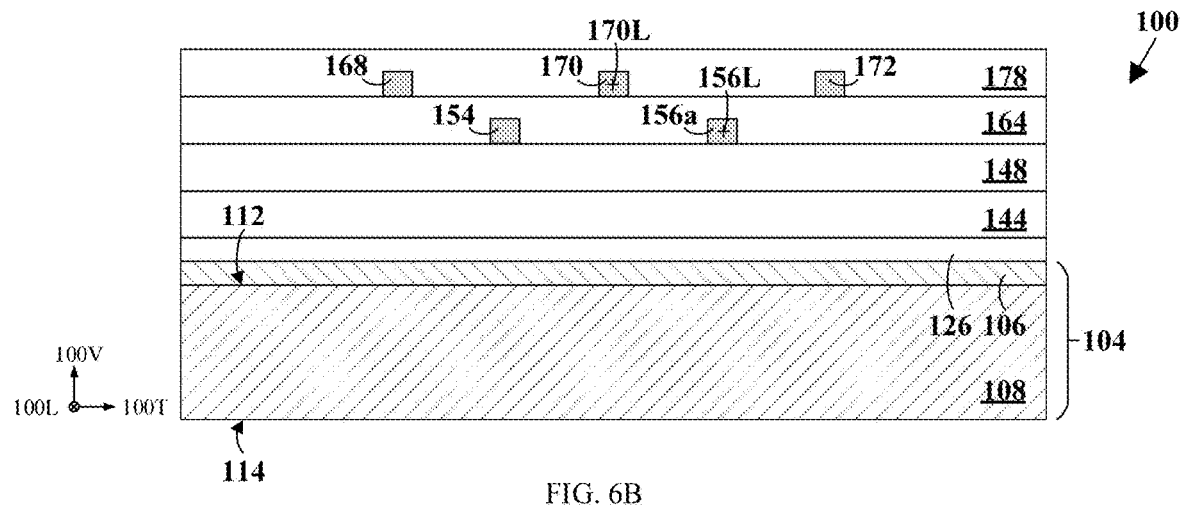
Figure 6C:
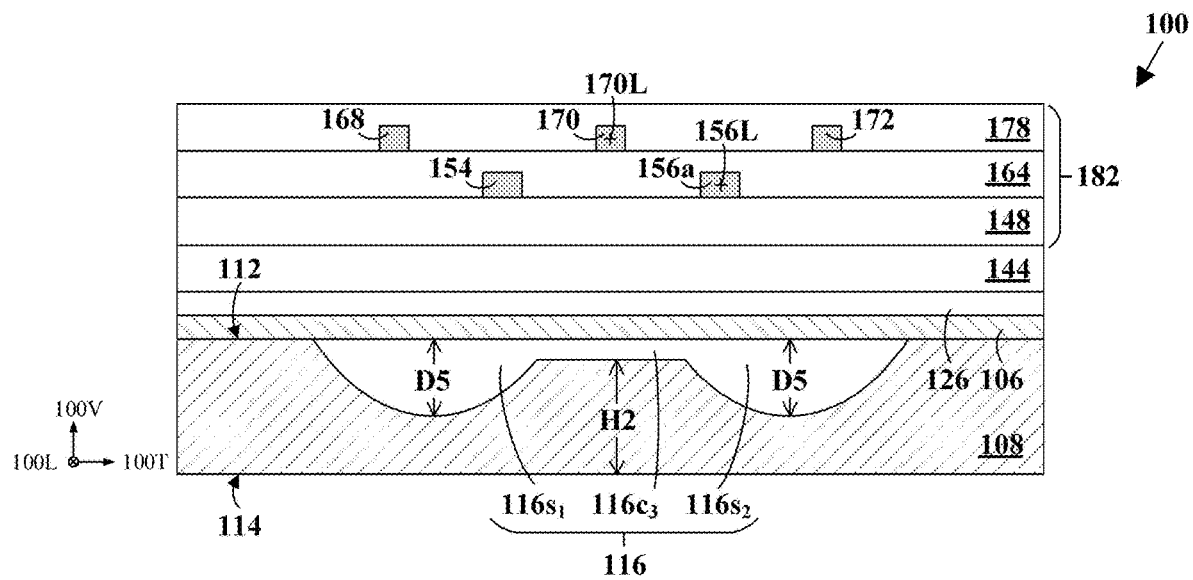
Figure 6D:
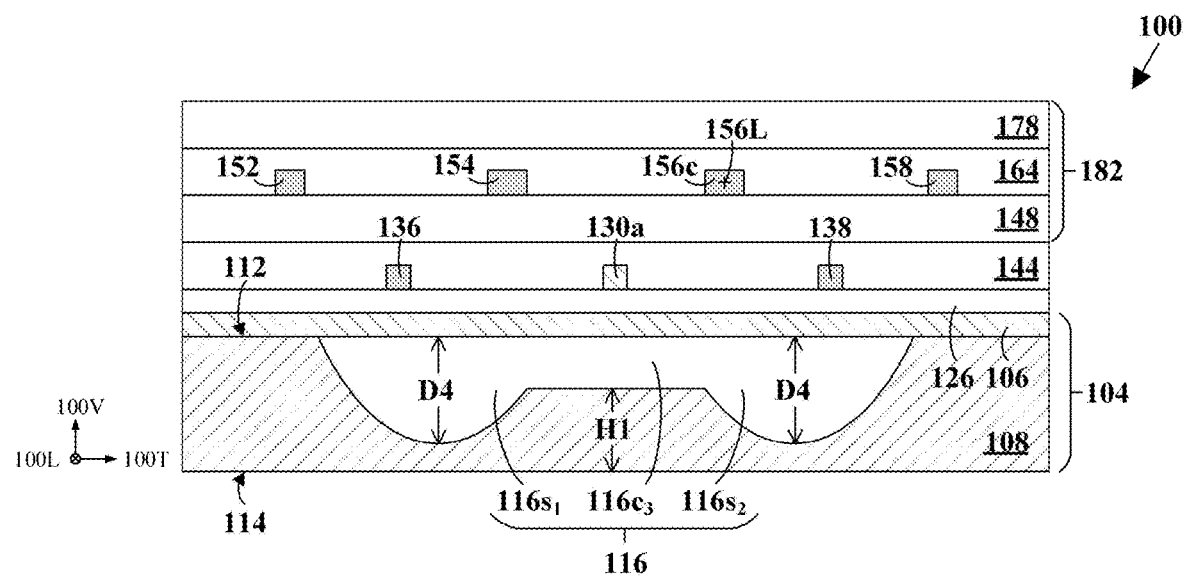

FIGS. 5A through 5C are exemplary top-down views of the edge coupler 100 at a fabrication stage subsequent to FIG. 3A, according to embodiments of the disclosure. FIGS. 6A through 6D are cross-sectional views of the edge coupler 100 taken generally along respective lines 4A-4A, 4B-4B, 4C-4C, and 4D-4D in FIG. 3A, according to embodiments of the disclosure. A dielectric layer 164 may be arranged over the dielectric stack 148 and the assisting waveguides 152, 154, 156, 158.

The dielectric layer 164 may include a side edge 166, and the side edge 166 of the dielectric layer 164 may form a part of the side edge 102 of the edge coupler 100. The side edge 166 of the dielectric layer 164 may be further arranged over the respective side edges 150, 146, 128, 110 of the dielectric stacks 148, 144, the dielectric layer 126, and the buried insulator layer 106. In an embodiment of the disclosure, the side edge 166 of the dielectric layer 164 may be substantially planar. In another embodiment of the disclosure, the side edge 166 of the dielectric layer 164 may be substantially coplanar with the respective side edges 150, 146, 128, 110 of the dielectric stacks 148, 144, the dielectric layer 126, and the buried insulator layer 106.

The dielectric layer 164 may include a dielectric material, for example, silicon dioxide and/or a dielectric material having a dielectric constant lower than that of silicon dioxide. The dielectric layer 164 may be deposited using a deposition technique, including a chemical vapor deposition process, during back-of-line processing.

Assisting waveguides 168, 170, 172 may be arranged on the dielectric layer 164 with a spaced arrangement. The assisting waveguide 170 may be arranged laterally between the assisting waveguides 168, 172, and may have a longitudinal axis 170L; the longitudinal axis 170L may be substantially parallel to the longitudinal axis 100L of the edge coupler 100. Each of the assisting waveguides 168, 170, 172 may have a finite length and may be terminated by an end surface 174 and an end surface 176 arranged laterally opposite the end surface 174.

The end surfaces 174 of the assisting waveguides 168, 170, 172 may be arranged over respective the side edges 166, 150, 146, 128, 110 of the dielectric layer 164, dielectric stack 148, the dielectric stack 144, the dielectric layer 126, and the buried insulator layer 106, and may form a part of the side edge 102 of the edge coupler 100. In an embodiment of the disclosure, the end surfaces 174 of the assisting waveguides 168, 170, 172 may be substantially planar. In another embodiment of the disclosure, the end surfaces 174 of the assisting waveguides 168, 170, 172 may be substantially coplanar with the respective side edges 166, 150, 146, 128, 110 of the dielectric layer 164, the dielectric stacks 148, 144, the dielectric layer 126, and the buried insulator layer 106. In yet another embodiment of the disclosure, the end surfaces 174 of the assisting waveguides 168, 170, 172 may be substantially coplanar with the end surfaces of the assisting waveguides 154, 156.

The assisting waveguides 168, 170, 172 may be arranged at an offset over the underlying assisting waveguides 136, 138, 152, 154, 156, 158 and the waveguide core 130, as illustrated in FIGS. 5A and 5C; the outlines of the assisting waveguides 152, 154, 156, 158, and the outlines of the assisting waveguides 136, 138, and the waveguide core 130 are diagrammatically shown as dash-dot lines and dash lines, respectively.

As illustrated in FIG. 5A, the assisting waveguides 168, 170, 172 may be arranged substantially parallel to each other and may have a substantially equal length dimension. In an embodiment of the disclosure, the end surfaces 174, 176 of the assisting waveguides 168, 170, 172 may be substantially planar and may be substantially parallel to each other. In another embodiment of the disclosure, the end surfaces 174 of the assisting waveguides 168, 170, 172 may be substantially coplanar with each other. In yet another embodiment of the disclosure, the assisting waveguides 168, 170, 172 may have a length shorter than the respective lengths of the assisting waveguides 154, 156.

Alternatively, as illustrated in FIG. 5B, the assisting waveguide 170 may have an overlapping arrangement with the waveguide core 130. Similar to FIG. 5A, the end surfaces 174 of the assisting waveguides 168, 170, 172 may be substantially coplanar with each other. In an embodiment of the disclosure, the assisting waveguide 170 may have a length that is longer than the respective lengths of the assisting waveguides 168, 172. In another embodiment of the disclosure, the end surfaces 176 of the assisting waveguides 168, 172 may be substantially coplanar with each other, while the end surface 176 of the assisting waveguide 170 may be arranged at an offset therefrom. In yet another embodiment of the disclosure, the assisting waveguides 168, 170, 172 may have a length shorter than the respective lengths of the assisting waveguides 154, 156.

Additionally, as illustrated in FIG. 5C, the assisting waveguides 168, 172 may be shaped as a bend that curves away from the longitudinal axis 100L of the edge coupler 100 along the transverse axis 100T, similar to the assisting waveguides 152, 158 in FIG. 3B. For example, a separation between the assisting waveguides 168, 170 may increase with increasing distance from their respective end surfaces 174, and the assisting waveguides 172 may curve away in an opposite direction relative to the assisting waveguide 168. In another embodiment of the disclosure, the assisting waveguides 168, 170, 172 may have substantially equal lengths.

The assisting waveguides 168, 170, 172 may have a width dimension that varies with position along its length. For example, the assisting waveguides 168, 170, 172 may have a maximum width at the end surface 174, and the assisting waveguides 168, 170, 172 may taper a direction towards the end surface 176. In an embodiment of the disclosure, the width of the assisting waveguides 168, 170, 172 at the end surfaces 176 may be narrower than the width at the end surface 174.

The assisting waveguides 168, 170, 172 may include a material that has a similar material composition as the underlying assisting waveguides 136, 138, 152, 154, 156, 158. For example, the assisting waveguides 168, 170, 172 may include a dielectric material having a substantially similar refractive index as the underlying assisting waveguides 136, 138, 152, 154, 156, 158. In an embodiment of the disclosure, the assisting waveguides 168, 170, 172 may include silicon nitride. In another embodiment of the disclosure, the assisting waveguides 168, 170, 172 may include silicon carbide.

The assisting waveguides 168, 170, 172 may be deposited using a deposition technique, including a chemical vapor deposition process, and subsequently patterned using a patterning technique, including lithography and etching processes, during back-end-of-line processing.

Processing continues with the formation of an additional dielectric layer 178 over the dielectric layer 164 and the assisting waveguides 168, 170, 172. The dielectric layer 178 may include a side edge 180 that may be substantially coplanar with the respective side edges 166, 150, 146, 128, 110 of the dielectric layer 164, the dielectric stacks 148, 144, the dielectric layer 126, and the buried insulator layer 106. The dielectric stack 148, the dielectric layer 164, and the dielectric layer 178 may form a back-end-of-line stack 182 of the edge coupler 100.

The respective side edges 180, 166, 150 of the dielectric layer 178, the dielectric layer 164, the dielectric stack 148, and the end surfaces 174, 160 of the assisting waveguides 168, 170, 172, and the assisting waveguides 154, 154 may form a side edge 184 of the back-end-of-line stack 182. The side edge 184 of the back-end-of-line stack 182 is further a part of the side edge 102 of the edge coupler 100.

As presented in the above disclosure, edge couplers and methods of forming the same are presented. The edge couplers may include an array of waveguides arranged in the middle-of-line region and the back-end-of-line region of a photonic chip. For example, the waveguide core 130 and the assisting waveguides 136, 138 may be arranged in the middle-of-line region, and the assisting waveguides 152, 154, 156, 158, 168, 170, 172 may be arranged in the back-end-of-line region.

The respective side edges 150, 166, 180 of the dielectric stack 148, the dielectric layer 164, and the dielectric layer 178, and respective end surfaces 160, 174 of the assisting waveguides 152, 154, 156, 158, 168, 170, 172 may be substantially coplanar with each other to form the side edge 184 of the back-end-of-line stack 182.

One or more layers of dielectric materials, for example, a moisture barrier layer, may be optionally arranged adjacent to the side edge 102 of the edge coupler 100, to serve as a protection layer for the edge coupler against environmental effects.

During an assembly phase, a light source, for example, an optical fiber may be laterally arranged adjacent to the side edge 184 of back-end-of-line stack 182. Due to the placements of the assisting waveguides 152, 154, 156, 158, 168, 170, 172 in the back-end-of-line stack 182, the optical fiber may be arranged adjacent to the side edge 102 of the edge coupler 100, and the optical fiber may be placed over the base substrate 108 or in a groove or an opening formed in the base substrate 108.

The edge coupler 100 may be a multi-stage edge coupler for the coupling of optical signals from the light source to the waveguide core 130. For example, the edge coupler 100 may include multi-stage cascading assisting waveguides along with the vertical axis 100V of the edge coupler 100, such as the assisting waveguides 168, 170, 175 at an upper level, the assisting waveguides 152, 154, 156, 158 at a lower level, and the assisting waveguides 136, 138 and the waveguide core 130 at the lowest level.

The optical signals from the light source may propagate into the edge coupler 100 through the assisting waveguides 168, 170, 175 at the upper level and the assisting waveguides 154, 156 at the lower level. As the assisting waveguides 168, 170, 175 may have a taper structure and may be unable to fully confine the mode of the optical signals, the mode of the optical signals may be pushed to the assisting waveguides 154, 156 at the lower level that has an inverse taper structure that can better confine the mode of the optical signals.

The optical signals may continue to propagate through the assisting waveguides 154, 156, and when the optical signals approach the end sections of the assisting waveguides 154, 156 that have a taper structure, the mode of the optical signals may again be pushed to a lower level and into the waveguide core 130. The optical signals then continue to propagate through the waveguide core 130 and out of the edge coupler 100 to the other components in the photonic chip.

As the mode of the optical signals becomes closer to the substrate 104, there may be potential optical signal losses through the substrate 104, adversely affecting the performance of the edge coupler 100. The sealed cavity 116 in the substrate advantageously minimizes optical signal losses through the substrate 104. The end section 130c of the waveguide core 130 may be arranged at an offset from the sealed cavity 116 to better confine the mode of the optical signals within the waveguide core 130. The sealed cavity 116 being fully confined within the substrate 104 also improves the manufacturability of edge coupler 100.

The array of assisting waveguides 152, 154, 156, 158, 168, 170, 172, and the dielectric stack 148, the dielectric layer 164, and the dielectric layer 178 in the different levels of the back-end-of-line stack 182 may minimize diffraction or reflection light at the wavelength of operation, and therefore, act as an effective optical material and form a metamaterial.

The terms "top", "bottom", "over", "under", and the like in the description and the claims, if any, are used for descriptive purposes and not necessarily for describing permanent relative positions. It is to be understood that the terms so used are interchangeable under appropriate circumstances such that the embodiments of the devices described herein are, for example, capable of operation in other orientations than those illustrated or otherwise described herein.

Additionally, the formation of a first feature over or on a second feature in the description that follows may include embodiments in which the first and second features are formed in direct contact, and may also include embodiments in which additional features may be formed interposing the first and second features, such that the first and second features may not be in direct contact.

Similarly, if a method is described herein as involving a series of steps, the order of such steps as presented herein is not necessarily the only order in which such steps may be performed, and certain of the stated steps may possibly be omitted and/or certain other steps not described herein may possibly be added to the method. Furthermore, the terms "comprise", "include", "have", and any variations thereof, are intended to cover a non-exclusive inclusion, such that a process, method, article, or device that comprises a list of features is not necessarily limited to those features but may include other features not expressly listed or inherent to such process, method, article, or device. Occurrences of the phrase "in an embodiment" herein do not necessarily all refer to the same embodiment.

In addition, unless otherwise indicated, all numbers expressing quantities, ratios, and numerical properties of materials, reaction conditions, and so forth used in the specification and claims are to be understood as being modified in all instances by the term "about".

Furthermore, approximating language, as used herein throughout the specification and claims, may be applied to modify any quantitative representation that could permissibly vary without resulting in a change in the basic function to which it is related. Accordingly, a value modified by a term or terms, such as "approximately", "about,", "substantially" is not limited to the precise value specified. In some instances, the approximating language may correspond to the precision of an instrument for measuring the value. In other instances, the approximating language may correspond to within normal tolerances of the semiconductor industry. For example, "substantially coplanar" means substantially in a same plane within normal tolerances of the semiconductor industry, and "substantially perpendicular" means at an angle of 90 degrees plus or minus a normal tolerance of the semiconductor industry.

While several exemplary embodiments have been presented in the above detailed description of the device, it should be appreciated that a number of variations exist. It should further be appreciated that the embodiments are only examples, and are not intended to limit the scope, applicability, dimensions, or configuration of the device in any way. Rather, the above detailed description will provide those skilled in the art with a convenient road map for implementing an exemplary embodiment of the device, it being understood that various changes may be made in the function and arrangement of features and methods of fabrication described in an exemplary embodiment without departing from the scope of this disclosure as set forth in the appended claims.

What is claimed is:

1. An edge coupler, comprising:
a substrate having a top surface;
a sealed cavity in the substrate, the sealed cavity having varying depths relative to the top surface of the substrate;
a waveguide core over the sealed cavity; and
a back-end-of-line stack over the waveguide core, the back-end-of-line stack comprises:
a side edge;
an interlayer dielectric layer; and
an assisting waveguide on the interlayer dielectric layer adjacent to the side edge, and the assisting waveguide and the waveguide core have an overlapping arrangement with the sealed cavity in the substrate.

2. The edge coupler of claim 1, wherein the sealed cavity comprises:
a first region proximate to the side edge of the back-end-of-line stack; and
a second region adjacent to the first region, wherein the first region has a depth, the second region has a depth, and the depth of the second region is deeper than the depth of the first region.

3. The edge coupler of claim 2, wherein the waveguide core comprises a front section, a middle section, and an end section, and the front section is arranged directly above the first region of the sealed cavity.

4. The edge coupler of claim 2, wherein the waveguide core comprises a front section, a middle section, and an end section, wherein a portion of the middle section is arranged directly over the second region of the sealed cavity.

5. The edge coupler of claim 4, wherein the middle section of the waveguide core is tapered towards the front section thereof.

6. The edge coupler of claim 2, wherein the waveguide core comprises a front section, a middle section, and an end section, wherein the end section is arranged at an offset from the sealed cavity.

7. The edge coupler of claim 1, wherein the waveguide core is centered above the sealed cavity.

8. The edge coupler of claim 1, wherein the waveguide core has an end surface, and the end surface of the waveguide core is spaced apart from the side edge of the back-end-of-line stack.

9. The edge coupler of claim 1, wherein the waveguide core has a length, and the sealed cavity has a length that is substantially parallel to the length of the waveguide core.

10. The edge coupler of claim 1, wherein the assisting waveguide has an end surface, and the end surface of the assisting waveguide is substantially coplanar with the side edge of the back-end-of-line stack.

11. The edge coupler of claim 1, wherein the substrate further comprises comprising an insulator layer over the substrate, and the sealed cavity is collectively surrounded by the insulator layer and the substrate.

12. An edge coupler, comprising:
a substrate having a bottom surface, the substrate having varying heights relative to the bottom surface of the substrate;
a sealed cavity in the substrate;
a waveguide core over the substrate; and
a back-end-of-line stack over the waveguide core, the back-end-of-line stack comprises:
a side edge;
an interlayer dielectric layer; and
a first assisting waveguide on the interlayer dielectric layer adjacent to the side edge, and the first assisting waveguide and the waveguide core have an overlapping arrangement with the sealed cavity in the substrate.

13. The edge coupler of claim 12, wherein the sealed cavity comprises:
a first region proximate to the back-end-of-line stack; and
a second region adjacent to the first region, wherein the substrate has a first height under the first region of the sealed cavity, a second height under the second region of the sealed cavity, and the second height of the substrate is shorter than the first height.

14. The edge coupler of claim 13, wherein the first region of the sealed cavity has a length, the second region of the sealed cavity has a length, and the length of the second region is longer than the length of the first region.

15. The edge coupler of claim 12, further comprising a second assisting waveguide, the second assisting waveguide is on the interlayer dielectric layer at the same level as the first assisting waveguide, wherein the second assisting waveguide is arranged at an offset from the sealed cavity in the substrate.

16. The edge coupler of claim 15, wherein the first assisting waveguide has an end surface that is substantially coplanar with the side edge of the back-end-of-line stack, and the second assisting waveguide has a side edge proximate to and spaced apart from the side edge of the back-end-of-line stack.

17. The edge coupler of claim 16, wherein the first assisting waveguide has a length, the second assisting waveguide has a length, and the length of the second assisting waveguide is shorter than the length of the first assisting waveguide.

18. The edge coupler of claim 16, wherein the second assisting waveguide has a substantially constant width dimension, and the first assisting waveguide has a varying width dimension.

19. A method of forming an edge coupler, comprising:
forming a sealed cavity in a substrate, the cavity is collectively surrounded by an insulator layer and a base substrate of the substrate;
forming a waveguide core over the sealed cavity; and
forming a back-end-of-line stack over the waveguide core, wherein forming the back-end-of-line stack comprises:
forming an interlayer dielectric layer over the waveguide core; and
forming an assisting waveguide over the interlayer dielectric layer, wherein a side edge of the interlayer dielectric layer and an end surface of the assisting waveguide form a part of a side edge of the back-end-of-line stack, and the assisting waveguide and the waveguide core have an overlapping arrangement with the sealed cavity in the substrate.

20. The method of claim 19, wherein forming the sealed cavity in the substrate comprises:
  patterning a plurality of openings through the insulator layer to the base substrate; and
  etching the base substrate with an isotropic etching process to form the cavity under the insulator layer.

\* \* \* \* \*